United States Patent
Balko

(10) Patent No.: US 9,930,308 B2
(45) Date of Patent: Mar. 27, 2018

(54) PLATFORM-AGNOSTIC VIDEO PLAYER FOR MOBILE COMPUTING DEVICES AND DESKTOP COMPUTERS

(71) Applicant: Soeren Balko, Indooroopilly (AU)

(72) Inventor: Soeren Balko, Indooroopilly (AU)

(73) Assignee: Clipchamp IP Pty Ltd, Enogerra (AU)

( * ) Notice: Subject to any disclaimer, the term of this patent is extended or adjusted under 35 U.S.C. 154(b) by 0 days.

(21) Appl. No.: 14/806,663

(22) Filed: Jul. 23, 2015

(65) Prior Publication Data
US 2016/0029002 A1 Jan. 28, 2016

Related U.S. Application Data

(60) Provisional application No. 62/029,432, filed on Jul. 26, 2014.

(51) Int. Cl.
| | |
|---|---|
| *H04N 21/41* | (2011.01) |
| *H04N 9/79* | (2006.01) |
| *G06F 12/00* | (2006.01) |
| *G06F 9/46* | (2006.01) |
| *H04N 21/414* | (2011.01) |
| *H04N 21/4143* | (2011.01) |
| *H04N 21/432* | (2011.01) |
| *H04N 21/443* | (2011.01) |

(52) U.S. Cl.
CPC ............. *H04N 9/7921* (2013.01); *G06F 9/46* (2013.01); *G06F 12/00* (2013.01); *H04N 21/4143* (2013.01); *H04N 21/41407* (2013.01); *H04N 21/4325* (2013.01); *H04N 21/4437* (2013.01)

(58) Field of Classification Search
None
See application file for complete search history.

(56) References Cited

U.S. PATENT DOCUMENTS

| | | | |
|---|---|---|---|
| 2005/0278735 A1* | 12/2005 | Boothe | H04N 7/17318 725/34 |
| 2007/0028260 A1* | 2/2007 | Williams | H04N 7/1675 725/31 |
| 2012/0330786 A1* | 12/2012 | Paleja | G06Q 30/02 705/26.41 |
| 2015/0109186 A1* | 4/2015 | Layson, Jr. | G02B 27/017 345/8 |
| 2015/0195320 A1* | 7/2015 | Avraham | H04L 69/04 709/219 |

* cited by examiner

*Primary Examiner* — Eileen Adams

(57) ABSTRACT

A platform-agnostic video player for mobile computing devices and desktop computers for playback of video and audio files on arbitrary computing devices, including mobile devices, laptop and desktop computers. The platform-agnostic video player for mobile computing devices and desktop computers generally includes a file retrieval component suitable for receiving a video or audio file; a video and audio decoding software component capable of decoding encoded video or audio data into a format suitable for display or playback; a video display and audio playback component; and a user interaction component.

13 Claims, 4 Drawing Sheets

PLATFORM-AGNOSTIC VIDEO PLAYER FOR MOBILE COMPUTING DEVICES AND DESKTOP COMPUTERS

CROSS-REFERENCE TO RELATED APPLICATIONS

This application claims the benefit of U.S. Provisional Application No. 62/029,432, filed 26 Jul. 2014.

BACKGROUND OF THE INVENTION

The present invention relates generally to video players and more specifically it relates to a platform-agnostic video player for mobile computing devices and desktop computers for playback of video and audio files on arbitrary computing devices, including mobile devices, laptop and desktop computers, wearable computing devices, and other computing devices suitable to display video frames and play back audio signals.

BRIEF SUMMARY OF THE INVENTION

The invention generally relates to a video player which includes a file retrieval component suitable for receiving a video or audio file; a video and audio decoding software component capable of decoding encoded video or audio data into a format suitable for display or playback; a video display and audio playback component; and a user interaction component.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a platform-agnostic video player for mobile computing devices and desktop computers for playback of video and audio files on arbitrary computing devices, including mobile devices, laptop and desktop computes.

Another object is to provide a Platform-agnostic Video Player For Mobile Computing Devices And Desktop Computers that is capable of playing back video and audio files on arbitrary computing devices, which provide a generic runtime environment, such as a World Wide Web browser.

Another object is to provide a Platform-agnostic Video Player For Mobile Computing Devices And Desktop Computers that can play back video and audio files that may be encoded using configurable video and audio codecs such as H.264, H.265, VP8, VP9, AAC, VORBIS, MP3 and others and that may differ in other parameters such as the video resolution, the number of video frames per second, the aspect ratio of the video, the bitrate of the video and audio streams, and others.

Another object is to provide a Platform-agnostic Video Player For Mobile Computing Devices And Desktop Computers that uses multiple central processing units (CPU) or multiple CPU cores (that may be present in a computing device used to play back video or audio files) at the given number of frames per second of the video or audio file.

Another object is to provide a Platform-agnostic Video Player For Mobile Computing Devices And Desktop Computers that uses co-processors such as a graphics processing unit (GPU) (that may be present in a computing device to play back video or audio files) at the given number of frames per second of the video or audio file.

Another object is to provide a Platform-agnostic Video Player For Mobile Computing Devices And Desktop Computers that offers an application programming interface (API) and graphical user interface (GUI) to control the playback of video of audio files, including pause, resume, change of player size, fullscreen mode, seek to position, etc. and non-standard controls like zooming in and out of a video, changing the view port in wide screen and panoramic videos ("pan"), and others.

Another object is to provide a Platform-agnostic Video Player For Mobile Computing Devices And Desktop Computers that offers a bundled mode where the video player software and one or a plurality of video or audio files are packaged into a single file, such as an hypertext markup language (HTML) file and where opening that file using a suitable standard software, such as a World Wide Web browser automatically plays back the video or audio file, requiring no further user interactions to open an audio or video file.

Another object is to provide a Platform-agnostic Video Player For Mobile Computing Devices And Desktop Computers that offers content protection mechanisms for a bundled player and video or audio file, where the video or audio file is encrypted and authorized users need to securely identify themselves using suitable authentication mechanisms, including password-based authentication, certificate-based authentication, using federated authentication mechanisms and others.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a block diagram illustrating the overall of the present invention. FIG. 1 illustrates a computing device 100, having a central processing unit (CPU) 120, an optional graphics processing unit (GPU) 130, a display (such as for example a built-in screen, a connected monitor or projector) 140, a sound output device (such as for example a speaker or headphones) 150, a local file storage (such as for example a hard drive or a solid state drive) 110, and a local device runtime environment (such as for example a World Wide Web browser, an ORACLE JAVA runtime environment and virtual machine, an ADOBE AIR runtime environment and virtual machine, a MICROSOFT .NET runtime environment and virtual machine) 60. The local device runtime environment comprises of a set of local device APIs (such as W3C HTML5 APIs and the KHRONOS GROUP WEBGL API) 62, and an application container 61 suitable to retrieve software applications (such as applications written in JAVASCRIPT, ORACLE JAVA, ADOBE ACTIONSCRIPT, MICROSOFT C# or any other programming language suitable to implement a video player and its components and compatible with the application container 61 and local device APIs 62.

FIG. 2 is a flowchart illustrating the overall operation of the present invention. FIG. 2 depicts a flowchart of the overall sequence of steps performed by the invention. In step 201, the process is started by some event, which may be a user interaction (e.G., a user opening a World Wide Web site that contains the player). In step 202, the local device runtime environment 60 retrieves the player software, comprising of the file retrieval component 10, the video and audio decoding component 20, the video and audio playback component 30, the user interaction component 40, and the native capabilities fallback component 50. The player software may be retrieved from a local source, such as the local file storage 110 or a remote source such as for instance a Web server or another end user device. In step 203, the local device runtime environment 60 evaluates the player software and creates a player instance in the application container 61. Evaluating the player software may entail parsing and compiling the source code, checking for software dependencies and performing any other preparation action in order to later run an instance of the player software. In step 204, it is checked whether the player software already contains a reference to a video or audio file (such as a UNIFORM RESOURCE LOCATOR, URL; a file name; a main memory address or any other resolvable identifier that can be used to locate the retrieve an audio and video file). The player may already be associated to a video or audio file reference if the player software components and the video or audio file are bundled into a single file or if the player shall automatically resume playback of a video. If no video or audio file reference exits, the user interaction component 40 retrieves an audio or video file reference from the device user in step 205. In step 206, the file retrieval component 10 opens the audio of video file 80. Depending on the video or audio file reference, the file retrieval component 10 delegates the task of opening the video or audio file 80 to one of its sub-components. In step 207, the video and audio decoding component 20 invokes the native capabilities fallback component 50 to test the local device for native video decoding and playback capabilities, suitable to handle the previously opened video or audio file 80. After probing the native device capabilities, the native capabilities fallback component 50 signals the native video and audio decoding and playback capabilities to the video and audio decoding component 20 in step 208. In step 209, it is determined whether the previously signalled native capabilities are sufficient to natively decode and playback the video or audio file 80. If so, in step 210 the native fallback video and audio decoding component 24 and the native fallback video and audio playback component 33 natively decode and play back the video or audio file 80 and afterwards terminate the process in step 216. If the decision in step 209 is "no", step 11 lets the video and audio decoding component 20 select and configure its sub-components, depending on the local device capabilities, such as its performance characteristics, the availability of a graphics processing unit (GPU) and accompanying support through the local device APIs 62, the number of central processing units (CPUs) or CPU cores on the local device, the network bandwidth and availability of an external streaming server that can deliver partially or fully de-coded video or audio data and other suitable criteria to determine the optimal strategy to decode video and audio data while preserving the video or audio quality (e.G., in terms of frames per second, resolution, etc.) or other criteria, such as energy consumption of the local device and network utilization. In step 212, the video and audio playback component selects and configures its sub-components for the subsequent playback of video and/or audio data. Similar to step 211, step 212 considers the local device hardware equipment, performance characteristics, and other criteria to select and configure one or a plurality of sub-components that will subsequently play back video and/or audio data. Subsequently, a sub-process 220 is recurrently invoked with portions of the video or audio file 80, which are successively retrieved by the file retrieval component 10. In step 213, the current portion of encoded video or audio data 85 is decoded by the video or audio decoding component 20, which delegates the decoding task to one or a plurality of its previously configured and selected sub-components. In step 214, the video and audio playback component 30 plays back the previously decoded video and/or audio data by delegating the play back to one of its previously selected and configured sub-components. In step 215, the user interaction component 40 is invoked to retrieve any intermediate user interactions or incoming automated control requests (such as to suspend the playback, to seek to a new position in the video or audio file, to switch to another screen size, etc.). Depending on the type of the interaction, step 215 may invoke the file retrieval component 10, the video and audio decoding component 20, or the video and audio playback component 30 to respond to the request. Once the video or audio file 80 was completely played back and no further portions of encoded video or audio data 85 can be retrieved, sub-process 220 ends and the process terminates in step 216.

FIG. 3 is an alternative embodiment of the present invention. FIG. 3 depicts an alternative embodiment of the player running on a computing device 100, where a video or audio file 80 and the player, comprising of multiple software components (file retrieval component 10, video and audio decoding component 20, video and audio playback component 30, user interaction component 40, and native capabilities fallback component) are packaged into a bundle 300, which can for instance be a hypertext markup language (HTML) file, an ADOBE FLASH animation, or any other bundled format suitable to simultaneously contain a video or audio file 80 and a video player having the aforementioned components. In a variant of the embodiment, the bundle 300 is a single file or an archive comprising multiple files. The embodiment of the invention further encompasses configuration data 301, which may be part of the bundle 300. The configuration data may contain settings influencing the behavior of the bundled player, such as the decoding and playback of the bundled video. For instance, the configuration data 301 may specify the users being authorized to play back the video, an expiration time when until when the video or audio file 80 may be played back, a geographic region within which computing devices 100 may play back the video or audio file 80, a preferred canvas size for the video playback and preferred audio volume for the audio playback and any other setting that may influence the decoding and playback experience of the video or audio file 80. The embodiment may further package a plurality of video or audio files 80 into a bundle 300. For instance, a bundle 300 may contain the same video or audio file 80 in different resolutions, different qualities, using different video or audio codecs. In another example, a bundle 300 may contain multiple different video or audio files 80, which may be subsequently played back or represent different simultaneous recordings (such as different camera angles) between which a user may switch. The embodiment of FIG. 3 further bundles a subset of the player components, namely the bundled file retrieval component 14, the local CPU video and audio decoding component 21, the local GPU video and audio decoding component 22, the native fallback video and audio decoding component 24, the 2D graphics video and audio playback component 31, the 3D graphics video and audio playback component 32, the native fallback video and audio playback component 33, the standard graphical controls 41, the non-standard graphical controls 42, the local capabilities probing component 51, and the notification component 52. Variants of this embodiment may omit further sub-components of components 10, 20, 30, 40, and 50. When the usage scenario of the embodiment is known before the bundle 300 is retrieved by a computing device 100, irrelevant sub-components may be excluded from bundle 300. For example, when a computing device 100 does not contain a graphics processing unit 130, bundle 300 may exclude the local GPU video and audio decoding component 22 and the 3D graphics video and audio playback component 32. In a variant of the embodiment of FIG. 3, a bundle 300 may be a file that is automatically executed upon receipt by computing device 100. For example, bundle 300 may be an HTML file that is automatically opened by a World Wide Web browser, instantaneously playing back the packaged video or audio file 80.

DETAILED DESCRIPTION OF THE INVENTION

A. Overview

Figure 1:
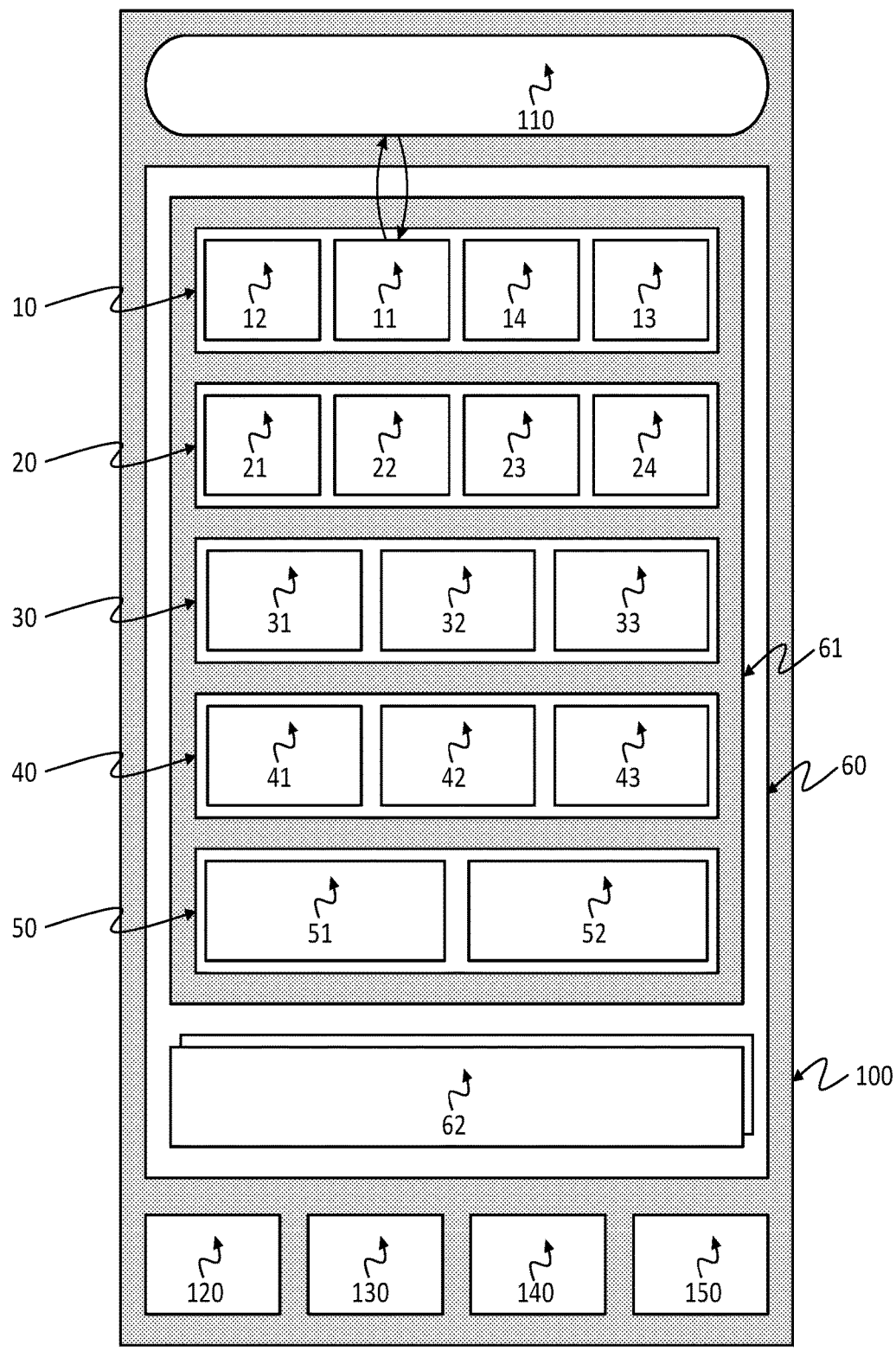
FIG. 1.
Figure 2A:
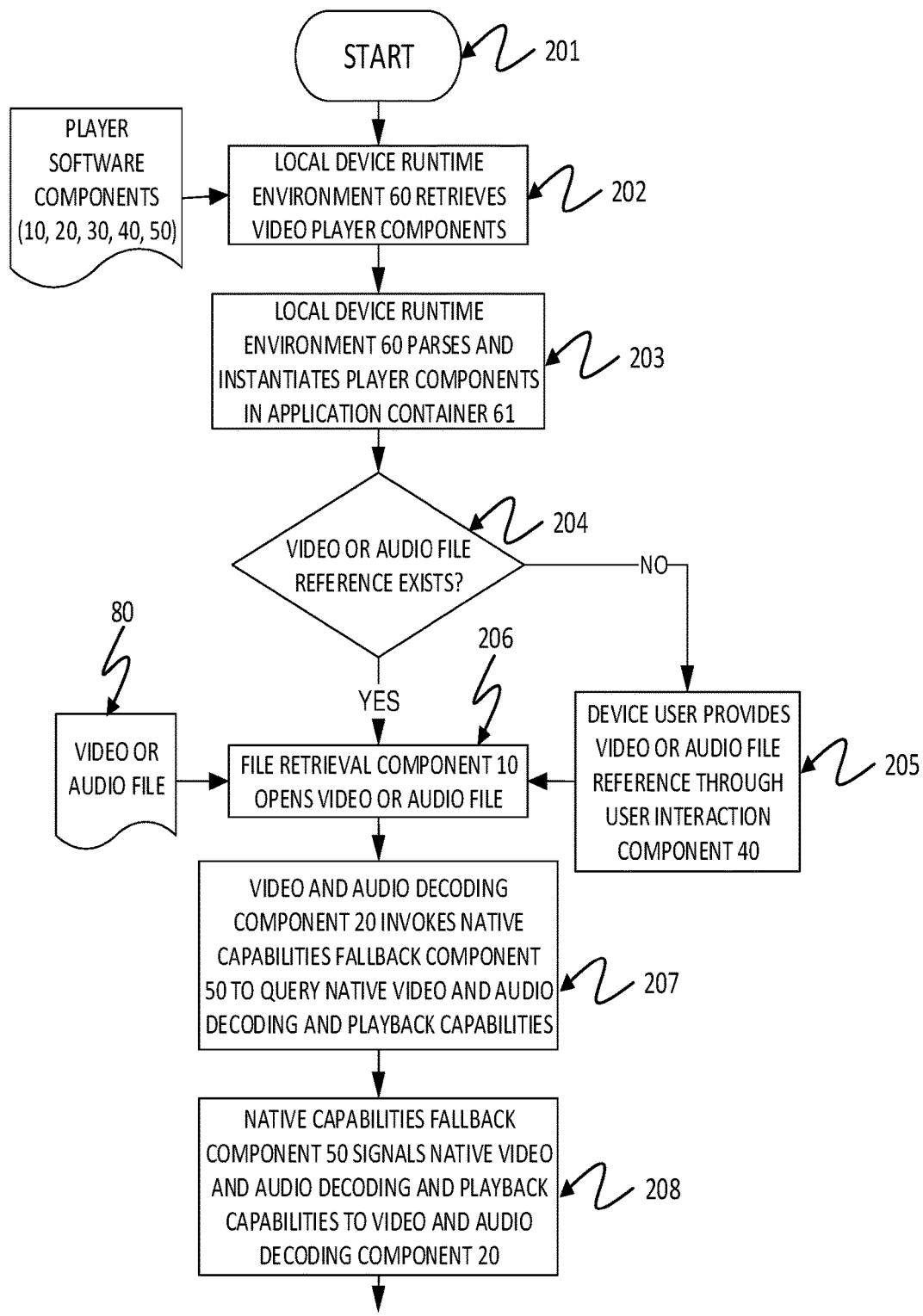
FIG. 2.
Figure 2B:
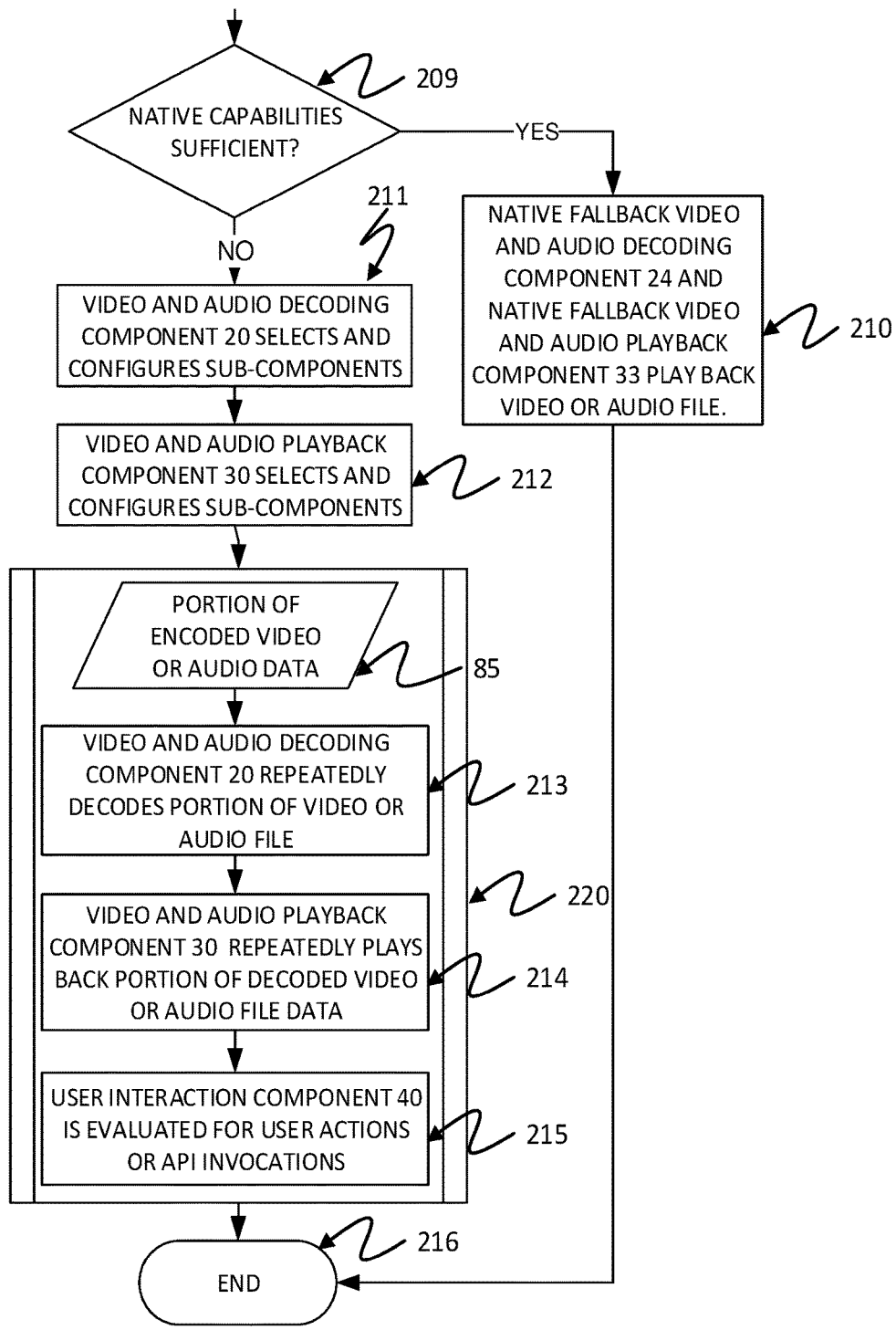
Figure 3:
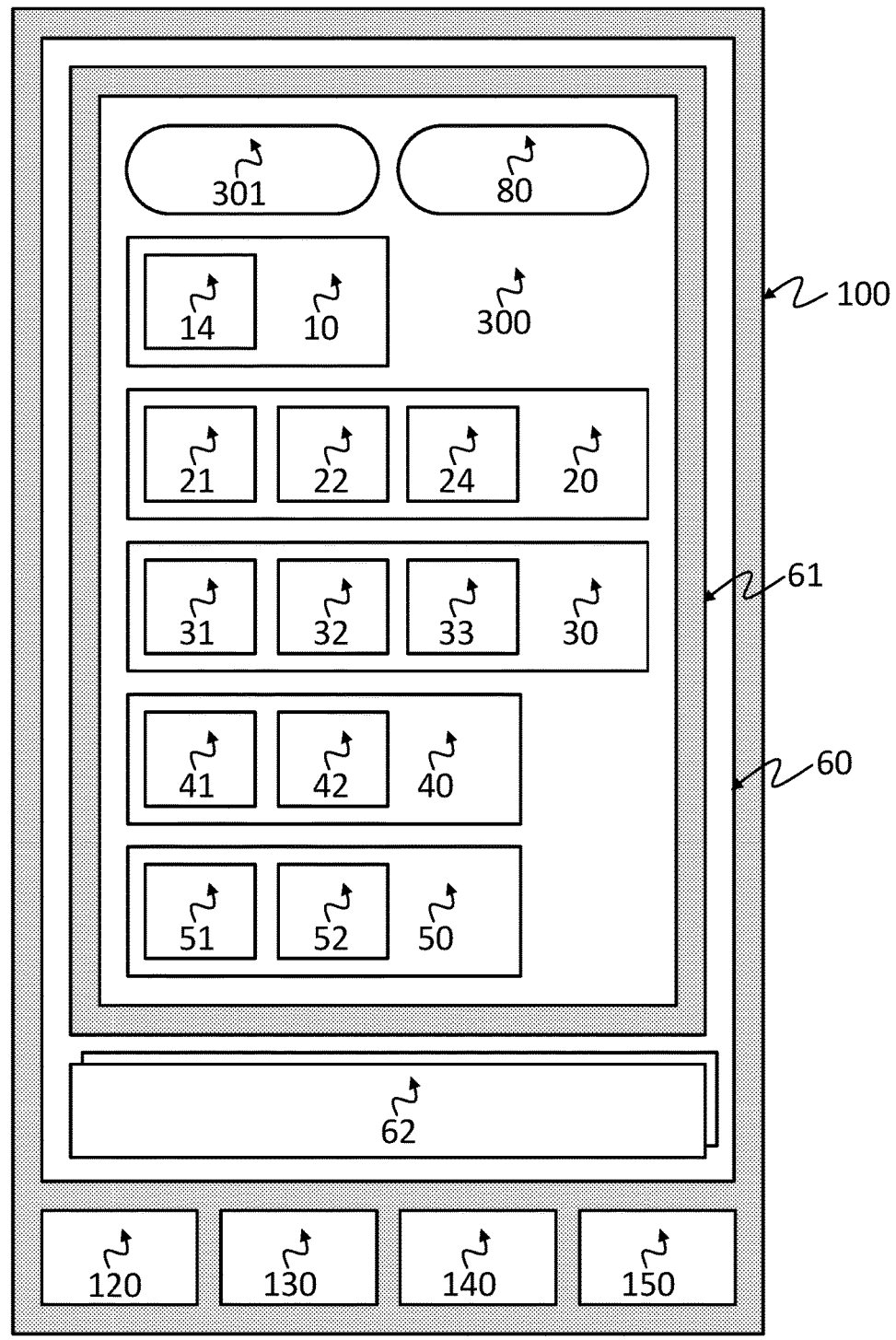
FIG. 3.

Turning now descriptively to the drawings, in which similar reference characters denote similar elements throughout the several views, the figures illustrate a file retrieval component suitable for receiving a video or audio file; a video and audio decoding software component capable of decoding encoded video or audio data into a format suitable for display or playback; a video display and audio playback component; and a user interaction component.

B. File Retrieval Component

The file retrieval component is a software component that runs within a computing device's generic runtime environment and provides an abstract mechanism for the invention to receive a video or audio file from different sources, including a storage components that are part of the computing device or a remote server, such as a Web server or streaming server.

The file retrieval component 10 locates a video or audio file on the local device (such as a smartphone, tablet computer, laptop computer, workstation, personal computer and other end user computing devices suitable to graphically display video frames and play back an audio signal), a remote server (such as a server or another end user computing device to which the local device is communicatively coupled using suitable communication protocols such as hypertext transfer protocol, HTTP, real-time streaming protocol, RTSP, stream control transmission protocol, SCTP and other protocols that are accessible through local device APIs 62 of the local device runtime environment 60). The file retrieval component further opens the video or audio file and passes data packets from that video or audio file to the video and audio decoding component 20 (upon requests of the video and audio decoding component 20).

In a first embodiment of the file retrieval component 10, the local file retrieval sub-component 11 provides access to video or audio files that are stored on the local playback device, such as for instance video files that are stored on a smart phone. In another embodiment of the file retrieval component 10, a remote file retrieval sub-component 12 provides access to video or audio files that are stored on another, communicatively coupled computing device, such as a HTTP server. In order to access the video or audio files stored on the other computing device, the remote file retrieval sub-component invokes APIs of the local runtime environment to transfer the remote files to the local device. For instance, in case of a local device runtime environment 60 that is a World Wide Web browser, the remote file retrieval sub-component 12 may invoke the WORLD WIDE WEB CONSORTIUM (W3C) WEBRTC API to transfer a video or audio file from another end-user computing device. Alternatively, the remote file retrieval sub-component 12 may invoke the W3C XMLHTTPREQUEST API to transfer a remote file from an HTTP server. In an alternative embodiment of the file retrieval component 10, a remote file streaming sub-component 13 may perform the interactions with another computing device such as a media streaming server implementing the HTTP LIVE STREAMING (HLS) protocols to successively retrieve data packets of a video or audio file using a streaming access to the video or audio file. In another embodiment of the file retrieval component 10, a bundled file retrieval sub-component 14 provides access to video or audio files that are bundled with the video player software components 10, 20, 30, 40, and 50 and packaged in a single file, such as a hypertext markup language (HTML) file. The content of the video or audio file is packaged into the single file also containing the player, using a suitable encoding format, such as binary-to-text encoding like BASE64, UUENCODE or others.

C. Video and Audio Decoding Component

The video and audio decoding component is a software component that runs within a computing device's generic runtime environment and implements a mechanism to decode encoded data that is contained in video or audio files, which are received from the file retrieval component into data that is suitable to be displayed on a computing device's display device or played back on a computing device's audio playback device.

The video and audio decoding component 20 requests and receives portions of a video or audio file from the file retrieval component 10. The received portions of the video or audio file are decoded from an video and audio encoding, using video and audio codecs such as MOTION PICTURE EXPERT GROUP (MPEG) H.264, GOOGLE VP8, INTERNATIONAL ORGANIZATION FOR STANDARDIZATION (ISO) ADVANCED AUDIO CODING (AAC), MPEG-2 AUDIO LAYER III (MP3), XIPH. ORG FOUNDATION VORBIS and other commonly used video and audio codecs, into a decoded format that is suitable to be passed to the video and audio playback component 30, such as the raw pixel values of the video frames and the raw audio signal to be played back.

In a first embodiment of the video and audio decoding component 20, a local CPU video and audio decoding sub-component 21 performs the decoding of encoded data packages received from the file retrieval component 10 by using the playback device's central processing unit (CPU) through decoding procedures running in the local device runtime environment 60. For example, when the local device's runtime environment is a World Wide Web browser, the decoding procedures may be implemented in JAVASCRIPT, as GOOGLE PORTABLE NATIVE CLIENT (PNACL) code, as ADOBE ACTIONSCRIPT code for the ADOBE FLASH runtime environment, as ORACLE JAVA code for the ORACLE JAVA APPLET runtime environment, as MICROSOFT C# code for the MICROSOFT SILVERLIGHT runtime environment, as GOOGLE DART code or any other implementation that is supported by the local device runtime environment 60. In a variant of the local CPU video and audio decoding sub-component 21, CPU capabilities such as single instruction, multiple data (SIMD) instructions may be used to improve performance. On local devices offering multiple CPUs or multiple CPU cores, where a single CPU or CPU core may not be sufficiently fast to decode a video or audio file to preserve the native video frame rate, such as modern smart phones, the local CPU video and audio decoding sub-component 21 may use multiple CPU or CPU cores to improve performance and guarantee for playing back the video and audio file at the native frame rate. In another embodiment of the video and audio decoding component 20, a local GPU video and audio decoding component 22 may perform certain tasks of the video decoding process on a graphics processing unit (GPU) or other suitable co-processors that are present on the local device, using APIs and programming models that are available to the local device runtime environment 60, such as KHRONOS GROUP WEBGL, KHRONOS GROUP WEBCL, NVIDIA CUDA, MICROSOFT DIRECTX and others. In another embodiment of the video and audio decoding component 20, a remote video and audio decoding component 23 retrieves partially or fully decoded video and audio data from a communicatively coupled external device such as a server computer. The remote video and audio decoding component 23 may directly retrieve the fully and partially decoded video and audio data from the other device, bypassing the file retrieval component. The remote video and audio decoding component 23 may further invoke the local CPU video and audio decoding sub-component 21 and the local GPU video and audio decoding sub-component 22 to perform a remaining portion of the decoding process for partially decoded data. In another embodiment of the video and audio decoding component 20, a native fallback video and audio decoding sub-component 24 fully or partially relays the decoding of encoded video and audio data received from the file retrieval component 10 to a native video and audio decoding capability present on the local device. For example, a local device runtime environment that is a World Wide Web browser, may offer APIs for video and audio playback such as HTML video and audio elements. The native fallback video and audio decoding sub-component 24 may conditionally relay the decoding of video and audio data, depending on the characteristics of the local device's native video and audio decoding capabilities. For example, it may test the codecs that are used by a video or audio file to be supported by the native video and audio decoding capabilities of the local device.

D. Video and Audio Playback Component

The video and audio playback component is a software component that runs within a computing device's generic runtime environment and receives decoded audio and video data from the video and audio decoding component and passes this data to the video and audio output devices on the computing device.

The video and audio playback component 30 receives decoded audio and video data from the video and audio decoding component 20 and passes the decoded video and audio data to APIs of the local device runtime environment 60. For instance, when the local device runtime environment 60 is a World Wide Web browser, supporting the hypertext markup language (HTML), version 5 APIs (HTML5), the video and audio playback component 30 may invoke the W3C WEBAUDIO API to play back the decoded audio signal and may invoke the HTML5 CANVAS or KHRONOS GROUP WEBGL APIs to display video frames on the local device's display.

In one embodiment of the video and audio playback component 30, a 2D graphics video and audio playback component invokes a 2D graphics API provided by the local device, which allows for displaying two-dimensional graphics. For the runtime environment being a World Wide Web browser, examples of a 2D graphics API include the W3C CANVAS API, the W3C DOCUMENT OBJECT MODEL (DOM) API, the W3C SCALABLE VECTOR GRAPHICS (SVG) API and other APIs that allow for drawing pixels of a video frame on a screen or other output device. In another embodiment of the video and audio playback component 30, the 3D graphics video and audio playback sub-component 32 uses a hardware-accelerated API to display video frames. For example, then the local device runtime environment 60 is a World Wide Web browser, the 3D graphics video and audio playback component 32 may use the KHRONOS WEBGL API and programming model to use the local device's GPU to output video frames on the local device's screen or other output device. In another embodiment of the video and audio playback component 30, the native fallback video and audio playback component 33 may use APIs to display a video or audio file in conjunction with the native fallback video and audio decoding component 24. For example, for the local device runtime environment 60 being a World Wide Web browser, the native fallback video and audio playback component may use the W3C video and audio elements to decode and play back a video or audio file using some native video and audio decoding and playback capabilities of the local device.

E. User Interaction Component

The user interaction component is a software component that runs within the computing device's generic runtime environment and provides for user interaction controls (such as a graphical user interface, or a voice user interface). Using these controls, a user may use operations such as pausing and resuming playback, rewinding and fast-forwarding a video or audio playback, changing the size of the displayed video image and other operations to influence the playback of a video or audio file.

The user interaction component 40 provides technical and user interfaces to control the operations performed by the player. For example, the user interaction component may comprise of graphical widgets such as buttons, sliders, input fields etc. The user interaction component may further offer application programming interfaces APIs for external software components to programmatically control the behavior of the player.

Standard operations that are invoked through the standard graphical controls 41 of the user interaction component 40 include standard operations like pausing, resuming, and seeking in a video or audio file, switching to full screen and back, changing the audio volume, and other operations that are applicable to any audio and video file. Other, non-standard operations that may be invoked from the non-standard graphical controls 42 of the user interaction component 40 may only apply to a subset of video or audio file with specific characteristics. For instance, a panoramic video may offer controls to change the camera angle and point of view within the panoramic video. In another example, for stereoscopic video the non-standard graphical controls may include user interaction widget to switch between the two camera angles and other controls. The application programming interface 43 that is part of the user interaction component 40 may provide operations to be performed by the player through an API, which can be invoked by an external software component. For example, when the local device runtime environment 60 is a World Wide Web browser, the player may offer JAVASCRIPT APIs, which can be invoked from other components on a HTML file that embeds the player.

F. Native Capabilities Fallback Component

The native capabilities fallback component is a software component that runs within the computing device's generic runtime environment and tests the local playback device for an alternative native video and audio player capability. If a native video and audio player capability on the local device exists, the native capabilities fallback component may instruct the video and audio decoding component and the video and audio playback component to use the native player capabilities.

The native capabilities fallback component 50 is responsible for identifying the most efficient way to play back a video or audio file, which includes using native capabilities of the local device runtime environment 60 to directly decode and play back video and audio files without invoking the player's video and audio decoding component 20 or and video and audio playback component 30.

The native capabilities fallback component 50 may invoke a local capabilities probing component 51 to test the local device for the presence and characteristics of native video and audio playback components. For example, when the local device runtime environment 60 is a World Wide Web browser, the local capabilities probing component 51 may check for the support of the HTML5 video and audio element capabilities and the video and audio codecs that are supported. The notification component 52 may then signal the presence and characteristics of these native video and audio decoding and playback capabilities to the native fallback video and audio decoding component 24 and the native fallback video and audio playback component 33.

G. Local Device Runtime Environment

The local device runtime environment is a standard application container that hosts and runs application components, such as the video and audio player. As such, it provides for a programming model, comprising at least one programming language to write computer software such as the player in, and a set of application programming interfaces (APIs), which may offer operations to access the local device's file storage, to connect and communicate to an external computing device over a network, to draw pixels or display images on a screen or other output device, to play back audio signals, to capture user commands such as mouse clicks, keyboard operations, touch gestures, voice commands, etc. And other suitable APIs that may be used by the player while retrieving, decoding, and playing back video and audio files.

The local device runtime environment 60 is a part of the local device that runs the player, which provides a programming model for the player, comprising an application container 61 that hosts the player application (comprising components 10, 20, 30, 40, 50 and their sub-components) and a set of local device APIs 62 that allow the other components to invoke functionality of the local device, such as file access, data transfer over networks, displaying images, drawing pixels and text on a display, playing back audio signals, capturing user input and other functionality suitable to support the operations of the player.

When the local device runtime environment 60 is a World Wide Web browser, the application container 61 may be a JAVASCRIPT runtime of the local device APIs may be a set of JAVASCRIPT APIs, such as the W3C DOCUMENT OBJECT MODEL (DOM) API, the W3C CANVAS API, the W3C WEBAUDIO API, the KHRONOS GROUP WEBGL API and others. In another embodiment of the local device runtime environment 60, the application container 61 may be an ADOBE FLASH runtime environment supporting applications coded in ADOBE ACTIONSCRIPT, with the local device APIs comprising of the ADOBE FLASH APIs. In a further embodiment of the local device runtime environment 60, the application container 61 may be an ORACLE JAVA VIRTUAL MACHINE (JVM) with the local device APIs 62 comprising of the APIs of the ORACLE JAVA RUNTIME ENVIRONMENT (JRE). In another example of the local device runtime environment 60, the application container 61 is the GOOGLE PORTABLE NATIVE CLIENT (PNACL) browser plugin, where the local device APIs 62 are given by the GOOGLE PEPPER API and a set of standard C/C++ libraries. In another embodiment of the local device runtime environment 60, the application container 61 may be a MICROSOFT SILVERLIGHT plugin, running MICROSOFT. NET byte code and the local device APIs are given by the MICROSOFT SILVERLIGHT API and a subset of APIs from the MICROSOFT. NET framework.

H. Connections of Main Elements and Sub-Elements of Invention

The file retrieval component 10 may comprise of a local file retrieval component 11, a remote file retrieval component 12, a remote file streaming component 13, and a bundled file retrieval component 14. The file retrieval component 10 is invoked from the video and audio decoding component 20, requesting an access operation on a video file, providing an address of the audio of video file and other filer access operation parameters. Depending on the file address, the file retrieval component 10 may decide to pass the request to one of its sub-components. For example, when the file address is a UNIFORM RESOURCE LOCATOR (URL), the URL scheme may identify the sub-component of the file retrieval component that must be invoked, where a FILE URL scheme denotes a local file that is handled by the local file retrieval component 11, a HTTP URL scheme is handled by the remote file retrieval component 12, a HLS URL is handled by the remote file streaming component 13, and a DATA URL is handled by the bundled file retrieval component.

The video and audio decoding component 20 may comprise of a local CPU video and audio decoding component 21, a local GPU video and audio decoding component 22, a remote video and audio decoding component 23 and a native fallback video and audio decoding component 24. The video and audio decoding component invokes the file retrieval component 10 to access a audio or video file. Upon receipt of encoded video or audio data from the file retrieval component 10, the video and audio decoding component configures and invokes at least one or a plurality of its sub-components to de-code the encoded audio or video data. The video and audio decoding component may decide on which sub-components to invoke based on criteria including the availability of certain local device APIs 62. For example, when the KHRONOS GROUP WEBGL API is available, the video and audio decoding component may invoke the local GPU video and audio decoding component to let it partially or fully de-code encoded video or audio data. In another example, if the W3C WORKER API is available, the video and audio decoding component may configure the local CPU video and audio decoding component to use multiple CPUs or CPU cores by spawning multiple WORKER instances, each decoding a different segment of the audio of video file. In another example, general device and contextual characteristics may determine the choice and configuration of the sub-components of the video and audio decoding component. For example, when a local device runtime environment 60 does not provide for performance that is needed to decode the video in real time, the remote video and audio sub-component may be invoked to retrieve pre-decoded video or audio data from another computing device, thus reducing or entirely eliminating the computational effort for decoding a video or audio file on the local device. The notification component 52 of the native capabilities fallback component 50 may directly notify the video and audio decoding component 20 to make it pass encoded video or audio data to the native fallback video and audio decoding component, which uses native video and audio decoding capabilities of the local device. The native fallback video and audio component may further communicate to the native fallback video and audio playback component 33, which is part of the video and audio playback component.

The video and audio playback component 30 may comprise of a 2D graphics video and audio playback component 31, a 3D graphics video and audio playback component 32, and a native fallback video and audio playback component 33. The video and audio playback component 30 receives decoded video frames and audio signals from the video and audio decoding component 20. Depending on device characteristics and contextual decisions, the video and audio playback component 30 passes the decoded video and audio data to at least one of its sub-components. For instance, when the local device APIs 62 offer an interface to a hardware-accelerated 3D graphics capability, the video and audio playback component 30 may pass the decoded video and audio data received from the video and audio decoding component 20 to the 3D graphics video and audio component 32. Otherwise, it may pass the decoded video and audio data to the 2D graphics video and audio component 31. The native fallback video and audio playback component 33 is invoked from the native fallback video and audio decoding component 24 whenever the local device offers suitable native video or audio decoding and playback capabilities.

The user interaction component 40 may comprise of standard graphical controls 41, non-standard graphical controls 42, and an application programming interface 43. The user interaction component 40 forms the starting point of the video or audio playback process where upon a user interaction through the standard graphical controls 41 or non-standard graphical controls 42 or a programmatic invocation of the application programming interface 43, the video and audio decoding component 20 is invoked. The video and audio decoding component 20 will, in turn, invoke the file retrieval component 10 to retrieve the encoded video or audio data and pass on de-coded video or audio data to the video and audio playback component 30, which is responsible for its output.

The native capabilities fallback component 50 may comprise of a local capabilities probing component 51 and a notification component 52. The native capabilities fallback component 50 is invoked by the video and audio decoding component 20 to let its local capabilities probing component 51 determine the existing and suitability of native local video or audio decoding and playback capabilities. If present, the notification component 52 calls back into the video and audio decoding component 20, thus influencing, which sub-component of the video and audio decoding component will decode the encoded video and audio data.

The local device runtime environment 60 may comprise of at least one application container 61 and a set of local device APIs 62. The file retrieval component 10 (and its sub-components), the video and audio decoding component 20 (and its sub-components), the video and audio playback component 30 (and its sub-components), the user interaction component 40 (and its sub-components), and the native capabilities fallback component 50 (and its sub-components) collectively make up the video and audio player software stack that is hosted in the application container 61 or the local device runtime environment 60. The local device APIs 62 are accessible to all components and sub-components of the video player software stack and may be invoked to perform a certain task.

I. Alternative Embodiments of Invention

In one embodiment of the invention, the local device runtime environment 60 is a World Wide Web browser offering a JAVASCRIPT interpreter as application container 61 and a set of APIs such as the W3C HTML5 standard APIs as local device APIs 62. The file retrieval component 10 (and all sub-components), the video and audio decoding component 20 (and all sub-components), and video and audio playback component 30 (and all sub-components), the user-interaction component 40 (and all sub-components), and the native capabilities fallback component 50 (and all sub-components) may then be software components implemented in JAVASCRIPT. In an alternative embodiment, some of the JAVASCRIPT software components may be cross-compiled from existing video decoding and playback software such as FFMPEG, MPLAYER, LIBAV, VIDEOLAN X264, GOOGLE LIBVPX or other suitable software packages, using cross-compiler tools such as MOZILLA EMSCRIPTEN, ONAN GAMES MANDREEL, GOOGLE WEB TOOLKIT, or other cross-compiler toolchains suitable to transform source code of a video player component into JAVASCRIPT.

In another embodiment of the invention, the local GPU video and audio decoding component 22 and the 3D graphics video and audio decoding component 32 may use the graphics processing unit (GPU) programming model, which is available as part of the local device runtime environment 60 to perform a subset of video and audio decoding and playback tasks on the GPU. For instance, certain computationally intense decoding tasks such as color space conversion may be implemented as GPU shader code, thus alleviating the central processing unit CPU from these tasks.

In another embodiment, the local CPU video and audio decoding component 21 and the 2D graphics video and audio playback component may use single instruction, multiple data (SIMD) or vector processing instruction sets and API that may be offered by the local device APIs 62 to improve the performance of video and audio decoding and playback.

In other embodiments of the invention, the local device runtime environment 60 may offer additional platform-neutral application containers 61 and accompanying local device APIs 62, such as an ORACLE JAVA VIRTUAL MACHINE, a MICROSOFT SILVERLIGHT plugin, an ADOBE FLASH plugin, a GOOGLE PORTABLE NATIVE CLIENT plugin, a GOOGLE DART runtime environment.

In another embodiment of the invention, a plurality of platform-dependent players may be used for different platforms, defined by different operating systems such as MICROSOFT WINDOWS, GOOGLE ANDROID, APPLE IOS and other and CPU architectures such as INTEL X86, AMD X64, ARM, and others.

J. Operation of Preferred Embodiment

The proposed invention is a video player software that is suitable to run on a plurality of popular end user computing devices, incorporating smart phones, wearable devices like smart watches and augmented reality goggles, tablet computers, laptop computers, desktop workstations, television set-top boxes and other computing devices that are suitable to display videos or play back audio signals.

Unlike video and audio players that base on video and audio decoding and playback standards, such as the HTML5 video and audio elements available in World Wide Web browsers, the proposed invention incorporates the entire video decoding and playback software stack. In particular, the proposed invention implements the video and audio codecs that are needed to de-code encoded video and audio files as part of playing back the video and audio files. By incorporating the decoding functionality into the player, a video or audio file that is encoded in a particular format plays back on any device, regardless of the specific characteristics of the native video and audio playback capabilities of the device.

The proposed invention mitigates the performance implications of decoding and playing back a video or audio file in software by a number of measures. For one, the invention falls back on native video and audio decoding and playback capabilities if these are suitable to decode and play back a given video or audio file. To do so, the invention probes the local device for the existence and characteristics of native video and audio playback and decoding capabilities and compares these against the file format and video and audio codecs that are used by the given video or audio file.

In cases when the native video and audio decoding and playback capabilities are not suitable to decode and play back a given video or audio file, the invention uses the locally available graphics processing unit (GPU) to perform certain computationally intense tasks such as color space conversion and rendering of video frames. Additionally, the invention uses data-parallelism APIs such as SIMD and vector instruction sets of the local device runtime environment 60.

The invention may further make use of multiple CPUs or CPU cores on the local device where a video is continuously split into subsequent segments. Splitting a video may happen taking specifics of the given video codec into account such that subsequent video segments can be de-coded without needing access to the decoded video frames from earlier segments. In one embodiment of this approach, splitting may happen along key frames, which denote a reference for subsequent frames. In another embodiment, the video or audio file is pre-partitioned into a number of independent, successive files before the player is invoked. Each video segment may then be de-coded on a separate CPU or CPU core using appropriate APIs such as the W3C WORKER APIs. Depending on the number of CPUs or CPU cores that are available on a given device, a plurality of successive video segments may be de-coded simultaneously on different CPUs or CPU cores. Playback starts after some or all of the simultaneously de-coded segments were completely decoded. Each CPU or CPU core that has completed decoding a video segment is given a new video segment in order of their sequence in the video file and until all video segments were de-coded.

The video player receives a video or audio file or stream from from a local or remote location, such as a storage device that is part of the local player device, a remote server that is communicatively coupled to the local player device over a network such as the Internet, a local video file that is bundled with the player in one or a plurality of files or any other accessible storage location for video or audio files.

Upon receiving a video or audio file, the player may authenticate a user to decrypt encrypted video or audio data. To authenticate a user against an external identity management system, the player my use a federated identity protocol such as OPENID, OAUTH or others. Upon successfully authenticating a user, the external identity management system may pass back an encryption key to de-crypt the video or audio file. Besides the user's identity, the player may enforce other constraints such as based on geographic regions, date, type of playback device, etc.

After optionally de-crypting encrypted video or audio data, it is passed to a video and audio decoding component (20), which is comprises a video or audio file parser, where video and audio data is retrieved from different container formats such as MATROSKA, QUICKTIME, WINDOWS MEDIA, and others and de-coded from different audio and video codecs such as MOTION PICTURE EXPERT GROUP (MPEG) H.264, GOOGLE VP8, INTERNATIONAL ORGANIZATION FOR STANDARDIZATION (ISO) ADVANCED AUDIO CODING (AAC), MPEG-2 AUDIO LAYER III (MP3), XIPH. ORG FOUNDATION VORBIS and other commonly used video and audio codecs.

After parsing and de-coding the video and audio data, it is passed to the video and audio playback component (30), which renders the individual video frames on an output device such as a computer monitor, a mobile device screen, a television screen, a smart goggles projection screen, or any other display device suitable to present video frames. The video and audio playback component (30) may further play back the audio signal on a suitable audio output device such as speakers or headphones.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The invention claimed is:

1. A method comprising:
  retrieving, via a runtime environment of a computing device, a player software comprising a file retrieval component, a decoder component and a native capabilities fallback component, where the runtime environment of a computing device is a World Wide Web browser that includes the capability to run software applications using standardized World Wide Web technologies such as HTML, CSS, JavaScript and WebAssembly; instantiating the player software in an application container of the runtime environment, where the player software is a software application using standardized World Wide Web technologies; opening, via the file retrieval component, a video or audio the, where the video or audio file in a standardized file format (such as MP4, MOV, WebNA, AVI) and using standardized encodings (codecs) such as H.264(HAVC), H.265(HEVC), VP8, VF9, AAC, MP3, Opus to compress the video and audio streams; determining, via the native capabilities fallback component, native video or audio capabilities of the computing device such as HTML5 video playback and video encoding application programming interfaces (APIs) that are exposed in the runtime component of a computing device; decoding the video or audio from the video or audio file, respectively, via one or both of the native video or audio capabilities and the decoder component based on the suitability of the native video or audio capabilities to handling the video or audio file, where the decoder component is a software artefact using World Wide Web technologies suitable to decode the encoded audio and video streams, which are contained in an audio or video file; and playing the decoded video or audio on the computing device using World Wide Web technologies and APIs such as the HTML5 video playback API, HTML5 canvas API, HTML5 WebAudio API.

2. The method of claim 1, wherein the player software comprises a user interaction component and the method comprises: receiving, via the user interaction component, one or more user interactions or automated control requests where the user interaction component is a set of user interface controls such as buttons, input fields based on World Wide Web programming artefacts, such as HTML and CSS widgets; and controlling one or more of the components of the player software based on the user interactions or automated control requests.

3. The method of claim 2 comprising:
displaying, via the player software, one or more graphical user interfaces (GUIs) to receive the one or more user interactions, where the graphical user interface is composed of user interface controls that are available through a standardized World Wide Web programming model using HTML, CSS, and JavaScript.

4. The method of claim 1, wherein the runtime environment is a World Wide Web browser with a JavaScript runtime environment and providing access to a set of World Wide Web standard APIs (HTML5).

5. The method of claim 1, wherein the player software components comprise one or more of the following: hypertext markup language code and JavaScript (synonymous to ECMAScript, but different from JAVA) code.

6. The method of claim 1
comprising one or both of parsing and compiling the player software from source code prior to instantiating the player software in the application container, where player software is composed of components using World Wide Web artefacts such as HTML markup, CSS user interface style definitions, JavaScript code, WebAssemby code.

7. The method of claim 1 comprising
retrieving the video or audio file as a bundle with the player software, where the bundle is a single HTML file, which embeds the HTML markup of the player software's user interface, the video or audio file encoded in a suitable binary-to-text encoding (such as base64, basE91) and inlined as a text string within the single HTML file, and the player software represented as JavaScript or WebAssembl code, inlined within the single HTML the.

8. The method of claim 7,
wherein the bundle comprises configuration data for configuring one or both of the decoding and the playback of the bundled video or audio file in the player software, that configuration data determining the audio or video the format, embedded audio and video stream encoding, playback parameters such as the video playback resolution or fullscreen playback, audio volume or muted playback, the video playback aspect ratio, the playback devices (screens attached to the device or window on screen, speakers or headphones attached to the device, speech-to-text devices), encryption information (password to decipher the audio or video file), watermarks to be shown in the playback and other configuration data.

9. The method of claim 8, wherein the configuration data specifies one or more of the following:
one or more users that are authorised to play the video or audio, the authorised users' identities represented using suitable authentication mechanisms on the World Wide Web such as OAuth2, OpenID, SAML, username-password authentication; an expiration time before which the video or audio can be played and which determines an expiration date and time after which the video or audio the can no longer be played back: a geographic region in within which computing devices may play the video or audio, where the geographic region is determined using technical capabilities that are available on the computing device such as its Internet protocol (IP) address or a range of IP addresses pertaining to a geographic region such as a country, the World Wide Web browser locale, which determines the region and language of the user operating the computing device; a canvas size for the playing of the video, determining the resolution and screen size of the played back video; and a volume for the playing of the audio.

10. The method of claim 7, wherein the video or audio file is automatically played via the player software when the bundle is retrieved, where retrieving the bundle corresponds to opening the single HTML in a World Wide Web browser and where playing back the bundled audio or video file requires no further user interactions and where the bundled audio or video file is an offline resource that is not a live stream or live recording.

11. The method of claim 7,
wherein the bundle comprises a plurality of video or audio files in different resolutions, qualities, video codecs or audio codecs, where the plurality or video or audio files is represented as inline text strings within a single HTML file using suitable binary-to-text encoding schemes, such as base64, basE91.

12. The method of claim 7, wherein the bundle comprises a plurality of video files representing different simultaneous recordings between which a user may switch, where the user interface controls to switch between the plurality of video files is part of the player software, which is embedded in the single HTML file and where the plurality or video files is represented as inline text strings within a single HTML the using suitable binary-to-text encoding schemes, such as base64, basE91.

13. The method of claim 1, wherein the player software is retrieved by the runtime environment in response to an opening of a website or by opening an HTML file that was previously stored on the computing device such as for instance by saving an email attachment to the computing device.

* * * * *